J. W. BOTELER.
Luncheon-Plate.
No. 163,355. Patented May 18, 1875.
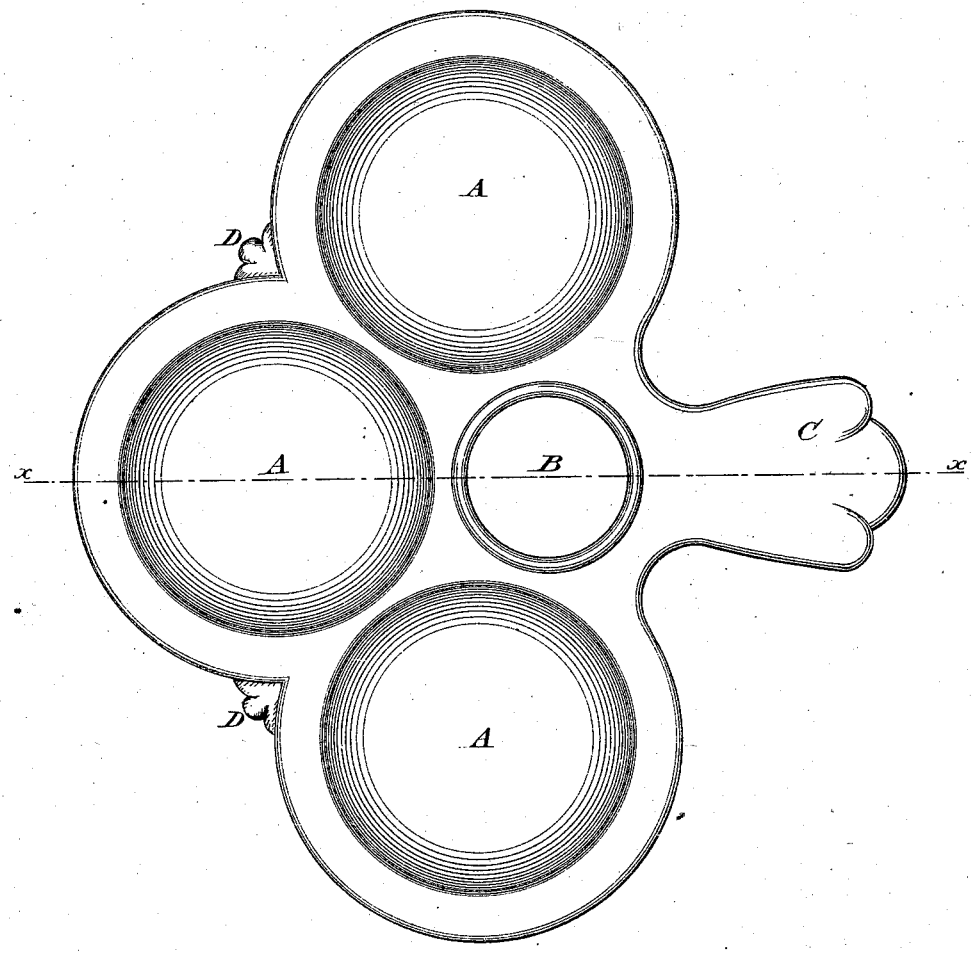
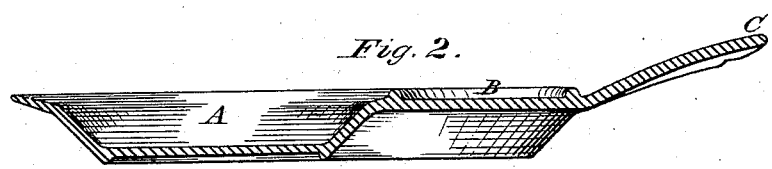

UNITED STATES PATENT OFFICE.

JOHN W. BOTELER, OF WASHINGTON, DISTRICT OF COLUMBIA.

IMPROVEMENT IN LUNCHEON-PLATES.

Specification forming part of Letters Patent No. 163,355, dated May 18, 1875; application filed May 8, 1875.

*To all whom it may concern:*

Be it known that I, JOHN W. BOTELER, of Washington, in the county of Washington and District of Columbia, have invented certain new and useful Improvements in Party-Plates; and I do hereby declare that the following is a full, clear, and exact description thereof, which enable others skilled in the art to which it pertains to make and use the same, reference being had to the accompanying drawing, and to the letters of reference marked thereon, which form a part of this specification.

The object of my invention is to provide a plate or dish for use at parties, dinners, sociables, &c.; and it consists of a plate or dish with three, more or less, main receptacles or dishes, a small receptacle for cup for coffee, chocolate, &c., and a handle to hold it by.

It is well known how inconvenient it is to hold two or three plates or dishes containing different kinds of eatables, such as salads, ice cream, jellies, &c., besides coffee or wine, &c. I have endeavored to overcome this inconvenience by furnishing a dish or plate with different receptacles for holding the various kinds of eatables desired, and which can be held conveniently. At the same time the number of plates usually required at such occasions is lessened, as, with my invention, one dozen will serve the same purpose that three dozen ordinarily will.

Figure 1 represents a plan view of my improved dish. Fig. 2 is a cross-section on line *x x* of Fig. 1.

In the drawing, A A A represent the receptacles or dishes for salads, ice cream, jelly, &c. B is the receptacle for a coffee or chocolate cup, or a wine-glass, and C is the handle by which the plate or dish is held. At the intersection of the dishes A, ornaments D, of any suitable shape, may be arranged, if desired, giving additional strength to the plates, and at the same time adding beauty to the general appearance thereof.

They may be made of any suitable material, and of any size, and the general contour may be also varied in different ways for purposes of ornamentation.

I am aware that dishes with partition or divisions have been used, and also that plates representing three or more oyster-shells, connected together and provided with a handle, are not new, and therefore do not broadly claim such; but

What I claim, and desire to secure by Letters Patent, is—

As a new article of manufacture, the dish or plate herein described, consisting of three or more food-receptacles, A, a holder, B, for cup or glass, and handle C, substantially as shown, and for the purpose set forth.

In testimony that I claim the foregoing as my own I affix my signature in presence of two witnesses.

JNO. W. BOTELER.

Witnesses:
THOS. JEWELL,
W. E. CHAFFEE.